(12) United States Patent
Kawamura et al.

(10) Patent No.: US 9,013,420 B2
(45) Date of Patent: Apr. 21, 2015

(54) DISPLAY DEVICE, DISPLAY PROGRAM, AND DISPLAY METHOD

(75) Inventors: Daisuke Kawamura, Tokyo (JP); Takahiro Ushioda, Tokyo (JP); Shingo Utsuki, Kanagawa (JP)

(73) Assignee: Sony Corporation (JP)

(*) Notice: Subject to any disclaimer, the term of this patent is extended or adjusted under 35 U.S.C. 154(b) by 174 days.

(21) Appl. No.: 13/286,345

(22) Filed: Nov. 1, 2011

(65) Prior Publication Data

US 2012/0113033 A1    May 10, 2012

(30) Foreign Application Priority Data

Nov. 10, 2010   (JP) .............................. P2010-252031

(51) Int. Cl.
*G06F 3/041*   (2006.01)
*G06F 3/0488*   (2013.01)

(52) U.S. Cl.
CPC .................................. *G06F 3/04886* (2013.01)

(58) Field of Classification Search
USPC ................ 345/173–178; 178/18.01–18.11
See application file for complete search history.

(56) References Cited

U.S. PATENT DOCUMENTS

| | | | | |
|---|---|---|---|---|
| 5,263,134 A | * | 11/1993 | Paal et al. | 715/788 |
| 2004/0169689 A1 | * | 9/2004 | Kim et al. | 345/905 |
| 2005/0225540 A1 | * | 10/2005 | Kawakami et al. | 345/173 |
| 2009/0319888 A1 | * | 12/2009 | Oygard | 715/252 |
| 2011/0181536 A1 | * | 7/2011 | Yoshihara et al. | 345/173 |
| 2011/0207507 A1 | * | 8/2011 | Asabu et al. | 455/566 |

FOREIGN PATENT DOCUMENTS

| | | | |
|---|---|---|---|
| JP | 2004-192573 A | 7/2004 | |
| JP | 2009-037344 A | 2/2009 | |
| WO | WO 2004107146 A2 * | 6/2004 | 345/173 |
| WO | WO 2005114638 A1 * | 12/2005 | 345/173 |

* cited by examiner

*Primary Examiner* — Abbas Abdulselam
*Assistant Examiner* — Gerald Oliver
(74) *Attorney, Agent, or Firm* — Lerner, David, Littenberg, Krumholz & Mentlik, LLP

(57) ABSTRACT

A display device includes a display section displaying instruction information to be instructed to users in an instruction information display region provided corresponding to the instruction information, a touch panel capturing an instruction represented by the instruction information displayed in the instruction information display region, in response to a users' touch operation to a touch detection region provided corresponding to the instruction information display region, and a control section performing a predetermined operation control based on the instruction information inputted through the touch panel. The instruction information display region is provided in an upward zone within the touch detection region.

18 Claims, 6 Drawing Sheets

DISPLAY DEVICE, DISPLAY PROGRAM, AND DISPLAY METHOD

CROSS-REFERENCE TO RELATED APPLICATION

The present application claims priority from Japanese Patent Application No. JP 2010-252031 filed in the Japanese Patent. Office on Nov. 10, 2010, the entire content of which is incorporated herein by reference.

BACKGROUND

The present disclosure relates to a display device equipped with a touch detection function, and a display program and a display method used for the display device.

In recent years, display devices are drawing attention in which a touch detection device, which is so-called touch panel, is mounted on the display device such as a liquid display device, and various button images or the like are displayed on the display device, making an information input possible as an alternative to commonly used mechanical buttons. Such a display device equipped with a touch panel does not necessitate an input device such as a keyboard, a mouse, and a keypad, so that it is increasingly used in a computer as well as in a mobile information terminal such as a mobile phone or the like.

Some methods have been proposed to improve the user operability of such a display device. For example, Japanese Unexamined Patent Application Publication No. 2009-37344 discloses a touch panel in which, in the case where a touch panel is operated from the side, not the front, or in the case where an operation button is hard to be viewed due to the dark indoor environment, the gap between a displayed button and a position actually touched is measured, and a touch detection region corresponding to the displayed button is expanded on the basis of the measured gap. Meanwhile, Japanese Unexamined Patent Application Publication No. 2004-192573 discloses an information-processing device in which, in the case where a scroll bar is operated and the region corresponding to the scroll bar is touched, the width of the scroll bar is expanded.

SUMMARY

Incidentally, simple operation is typically desired in electronic apparatuses in terms of specifications, circuit scale, and current consumption required for hardware. However, in the touch panel disclosed in Japanese Unexamined Patent Application Publication No. 2009-37344 and the information-processing device disclosed in Japanese Unexamined Patent Application Publication No. 2004-192573, since a touch detection region and the width of scroll bar are dynamically changed on the basis of the touched position, there is a need for a function for such a control, so that there is a possibility that system configuration becomes complicated.

It is desirable to provide a display device, a display program, and a display method capable of improving operability with a simple system configuration.

A display device of the embodiments of the present disclosure includes a display section, a touch panel, and a control section. The display section displays instruction information to be instructed to users in an instruction information display region provided corresponding to the instruction information. The touch panel captures an instruction represented by the instruction information displayed in the instruction information display region, in response to a users' touch operation to a touch detection region provided corresponding to the instruction information display region. The control section performs a predetermined operation control based on the instruction information inputted through the touch panel.

A display program of the embodiments of the present disclosure is adapted to cause a computer to execute a procedure, and the procedure includes providing a touch detection region on a display screen having touch detection function, providing an instruction information display region in an upward zone within the touch detection region, and displaying instruction information to be instructed to users in the instruction information display region.

A display method of the embodiments of the present disclosure includes providing a touch detection region on a display screen having touch detection function; providing an instruction information display region in an upward zone within the touch detection region, and displaying instruction information to be instructed to users in the instruction information display region.

With the display device, the display program, and the display method of the embodiments of the present disclosure, instruction information is displayed in an instruction information display region, and when the user touches a touch detection region on the basis of the instruction information, the information based on the instruction information is input. The instruction information display region is provided in an upward zone within the touch detection region. Thus, when the user confirms instruction information and performs a touch, the touch is detected at the instruction information display region and the touch detection region provided in such a manner as to be expanded from the lower side of the instruction information display region.

In the display device of the embodiments of the present disclosure, for example, the instruction information display region may be provided in a zone of upper two-thirds of the touch detection region or in a zone of upper half of the touch detection region.

For example, the instruction information may be represented as letters, symbols, or colors. In addition, for example, the instruction information may be represented as a scroll bar having a length corresponding to the size of the instruction information display region. In this case, for example, the scroll bar may be elongated in the vertical direction, and the scroll bar is provided in an upward zone within the touch detection region when the vertical length of the scroll bar is shorter than a predetermined length.

For example, a vertical length of the touch detection region may be 0.02 meter or less.

For example, the display section may further display an operation button in a region just coincident with the touch detection region. It is to be noted that, "coincide" is not limited to a state in which the operation button and the touch detection region are strictly identical to each other. For example, it is possible that the operation button has a circular shape, and the touch detection region has a rectangular shape circumscribed to the circular shaped operation button. In addition, the display section may further display an operation button including the instruction information display region therein, and the operation button may be provided in an upward zone within the touch detection region.

For example, the display device may be a remote controller. In addition, for example, the display device may be a mobile unit.

With the display device, the display program, and the display method of the embodiments of the present disclosure, since the instruction information display region is provided in in an upward zone within corresponding touch detection region, it is possible to improve operability with a simple configuration.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, embodiments of the present disclosure will be specifically described with reference to the drawings. The description will be made in the following order.
1. First Embodiment
2. Second Embodiment
3. Third Embodiment
1. First Embodiment
[Exemplary Configuration]
(Exemplary General Configuration)

Figure 1:
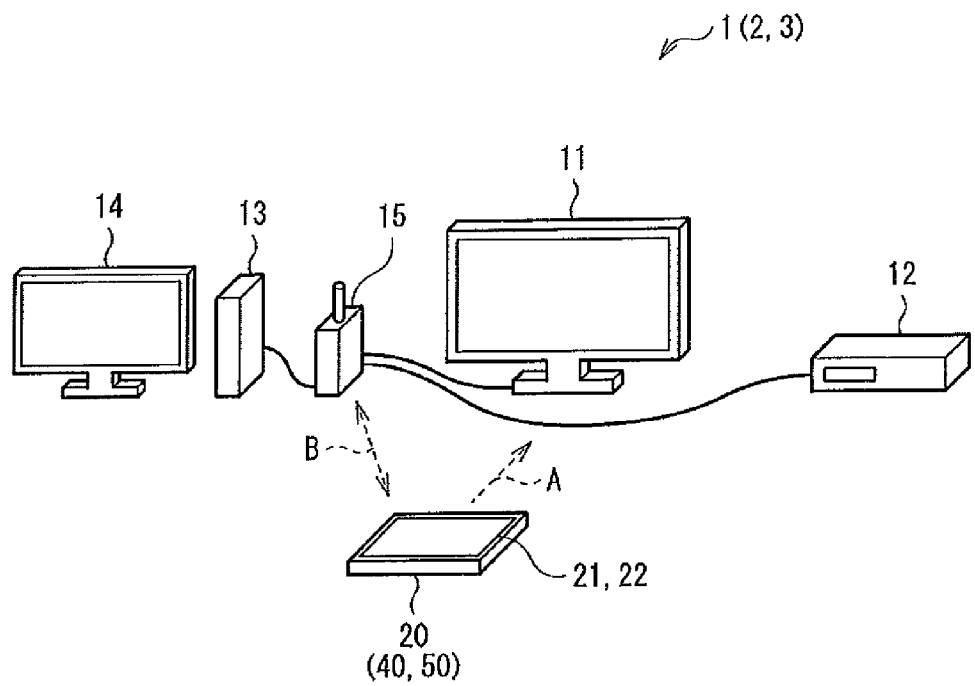
FIG. 1 is a configuration diagram illustrating an exemplary configuration of an electronic apparatus system according to embodiments of the present disclosure.

FIG. 1 is a configuration diagram illustrating an exemplary configuration of an electronic apparatus system according to embodiments of the present disclosure. The electronic apparatus system is made up of a remote controller (hereinafter referred to as a remote controller) including a display section and a touch panel, and various electronic apparatuses operated with the remote. It is to be noted that, a display program and a display method according to the embodiments of the present disclosure are embodied by the present embodiment, and the description thereof will also be made here.

An electronic apparatus system 1 includes a television receiver 11, a video recording/reproducing apparatus 12, a personal computer (PC) 13, a PC monitor 14, an access point 15, and a remote controller 20.

In this example, the television receiver 11 receives and displays terrestrial broadcasts and BS (Broadcasting Satellite)/CS (Communications Satellite) broadcasts. The video recording/reproducing apparatus 12 is, for example, a BD (Blu-ray Disc (registered trademark)) recorder, a hard disk recorder, or the like, and records terrestrial broadcasts and BS/CS broadcasts, or reproduces recorded content or the like. The PC 13 is, for example, a computer in which content information of an image or the like is stored, and the PC monitor 14 is a display device used to operate the PC 13.

The remote 20 operates these electronic apparatuses, and includes a display section 21 (described later) and a touch panel 22 (described later). In addition, the remote 20 has communication mechanism A using infrared communication or the like, and is capable of remotely operating the television receiver 11, for example.

The access point 15 interconnects a wireless LAN (Local Area Network) and a wired LAN. The access point 15 is interconnected to, via the wired LAN, the television receiver 11, the video recording/reproducing apparatus 12, and the PC 13, and interconnected to, via the wireless LAN (communication mechanism B), the remote 20.

The television receiver 11, the video recording/reproducing apparatus 12, and the remote 20 in this example conform to DLNA (Digital Living Network Alliance) guideline, and are capable of exchanging information seamlessly between the electronic apparatuses including the PC 13 via a network.

With the configuration described above, in the electronic apparatus system 1, it is possible for the user to operate the electronic apparatuses by touching an operation button or the like displayed on the display section 21 of the remote 20. Specifically, for example, in the case where an operation screen for operating the television receiver 11 is displayed on the display section 21, it is possible for the user to carry out a channel operation of the television receiver 11 by pressing the channel button displayed on the display section 21, for example. In addition, for example, in the case where a list of video content stored in the PC 13 is displayed on the display section 21, it is possible for the user to select the video content to view from among the list in order to display the selected video content on the television receiver 11.

It is to be noted that, the configuration of the electronic apparatus system 1 is not limited to the above-described one, and it is not necessary to include all of the above-described components of the electronic apparatus system 1, and further, a network apparatus or the like such as a NAS (Network Attached Storage) for storing video content may be further added thereto, for example.

(Remote 20)

Figure 2:
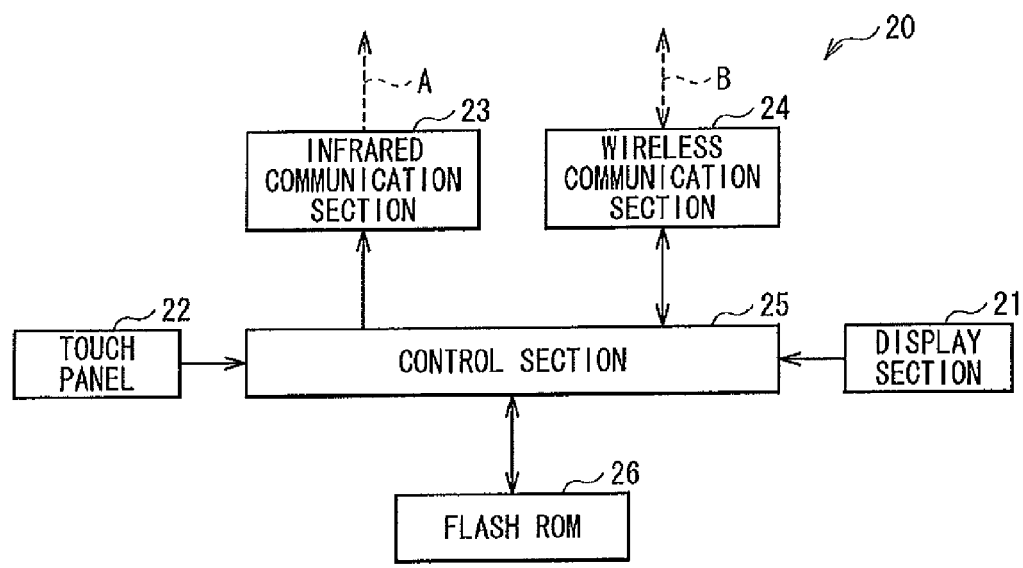
FIG. 2 is a block diagram illustrating an exemplary configuration of a remote controller according to a first embodiment.

FIG. 2 illustrates an exemplary configuration of the remote 20. The remote 20 includes the display section 21, the touch panel 22, an infrared communication section 23, a wireless communication section 24, a control section 25, and a flash ROM 26.

The display section 21 displays an operation screen for the user operating an electronic apparatus such as the television receiver 11, and made up of a liquid crystal display device, for example. The touch panel 22 is overlaid on the display section 21, and functions as an input interface when the user inputs information based on the display of the display section 21. The infrared communication section 23 exchanges information with the television receiver 11 with use of the communication mechanism A, for example. The wireless communication section 24 exchanges information with PC 13 and the like via the access point 15 with use of the communication mechanism B. The control section 25 controls these blocks. The flash ROM 26 stores therein a program necessary for the control section 25 to carry out the control.

Figure 3:
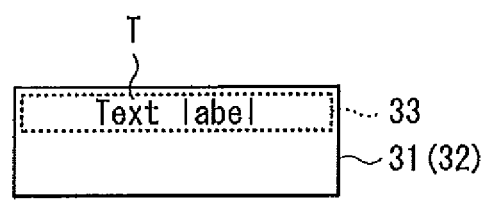
FIG. 3 is an explanatory view illustrating the relationship between an operation button, a touch detection region, and an instruction information display region according to the first embodiment.

FIG. 3 illustrates an example of an operation button 31 arranged on an operation screen. The operation button 31 is provided with a touch detection region 32 and an instruction information display region 33. The touch detection region 32 is an active region capable of detecting a touch. The instruction information display region 33 is a region which displays instruction information T for presenting the function of the operation button to the user. As described later, letters, symbols, colors, and the like are applicable as the instruction information T, for example.

In this example, the touch detection region 32 is provided so as to coincide with a display region of the operation button 31. In other words, when the user touches the display region of the operation button 31, the touch is detected at the touch detection region 32 configured to coincide with the operation button 31, and the remote 20 recognizes that the operation button 31 is touched. The vertical length of the touch detection region 32 (operation button 31) is 0.02 meter, for example.

Further, in this example, the instruction information display region 33 is provided in the upward zone within the touch detection region 32. Thus, as described later, when the user carries out a touch with use of his/her finger while looking the instruction information T displayed on the instruction information display region 33, the touched position is likely to fall within the range of the touch detection region 32.

In this case, the remote 20 corresponds to a specific example of "a display device" of the present disclosure.

[Operation and Function]

Next, the operation and the function of the remote 20 according to the present embodiment will be described.

(Overview of General Operation)

Firstly, overview of general operation of the remote will be described with reference to FIGS. 1 to 3. The remote 20 displays on the display section 21 an operation screen for operating an electronic apparatus, and receives operational instructions from the user. Specifically, the display section 21 displays the operation button 31 configured such that the instruction information display region 33 is provided in the upward zone within the touch detection region 32. The touch panel 22 receives information inputted by the user. The infrared communication section 23 generates a remote control signal R based on the user operation, and transmits the generated remote control signal R to the television receiver 11 by using the communication mechanism A. Based on the user operation, the wireless communication section 24 exchanges information with an electronic apparatus by using the communication mechanism B. The control section 25 operates based on the program stored in the flash ROM, and controls these blocks.

(Touch Detection Region 32 and Instruction Information Display Region 33)

The function of the touch detection region 32 and the instruction information display region 33 provided in the operation button 31 will be described next.

Figure 4:
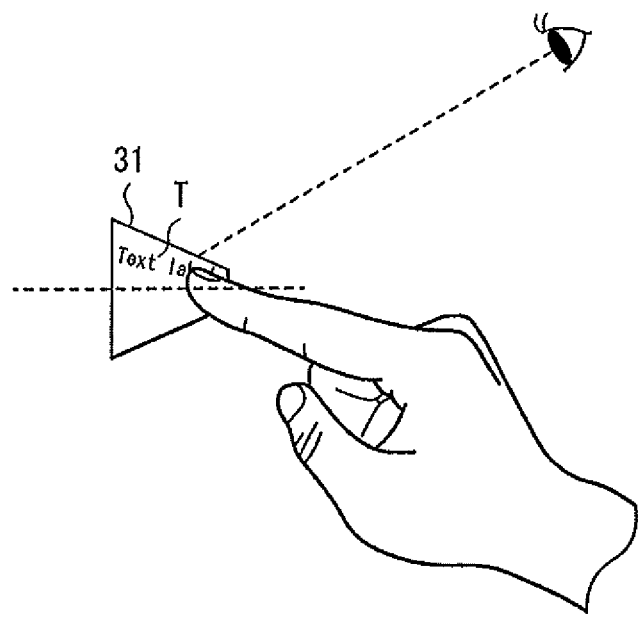
FIG. 4 is an explanatory view illustrating a touch operation at a display section.

FIG. 4 illustrates an action of the user touching the operation button 31.

When operating an operation button, the user recognizes the function of the operation button by looking instruction information displayed on the operation button, and then touches the operation button. At this time, the position actually touched by the user (e.g., the center of a contact region between a finger and an operated surface) is not necessarily the position intended by the user. To be more specific, the position actually touched tends to be lower than the center of the operation button in the vertical direction due to the fact that the user tends to look the instruction information, that the tip of a finger has a rounded shape, and the like. Therefore, in an exemplary case where instruction information is displayed around the center of an operation button in the vertical direction and the size of the operation button in the vertical direction is small (e.g., 0.02 meter or smaller), there is a possibility that the touched position is at the outside of the operation button (touch detection region), and that the detection of the touch fails.

In view of this, as illustrated in FIG. 4, in the remote 20, the instruction information display region 33 is provided in the upward zone within the operation button 31 (or the touch detection region 32). Thus, when the user carries out a touch while looking the instruction information T displayed in the upper region of the operation button 31, it is possible to reduce the gap between the touched position and the center of the operation button. In other words, the remote 20 displays the instruction information T in the upper region of the operation button 31 to lead the user so that the touched position is around the center of the operation button 31.

As described above, since in the remote 20 the relative relationship between the touch detection region 32 and the instruction information display region 33 is so configured that the touched position is likely to fall within the touch detection region 32, it is possible to improve operability. In other words, the remote 20 does not dynamically change the touch detection region 32 as illustrated in Japanese Unexamined Patent Application Publication Nos. 2009-37344 and 2004-192573, but realizes the improvement of operability with the static configuration. As a result, the operation of the remote 20 is simple, so that it is possible to simplify the configuration thereof as well.

(Exemplary Operation Screen)

Next, some exemplary operation screens will be described.

Figure 5A:
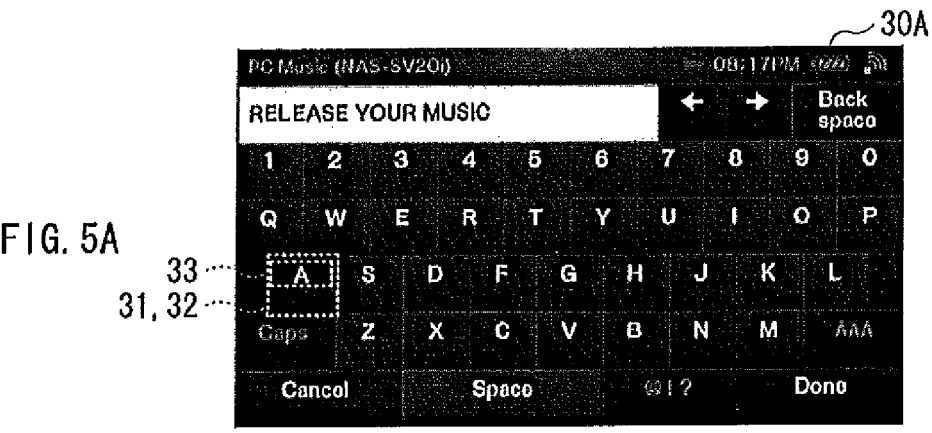
FIGS. 5A to 5C are explanatory views illustrating exemplary displays of the display section according to the first embodiment.
Figure 5B:
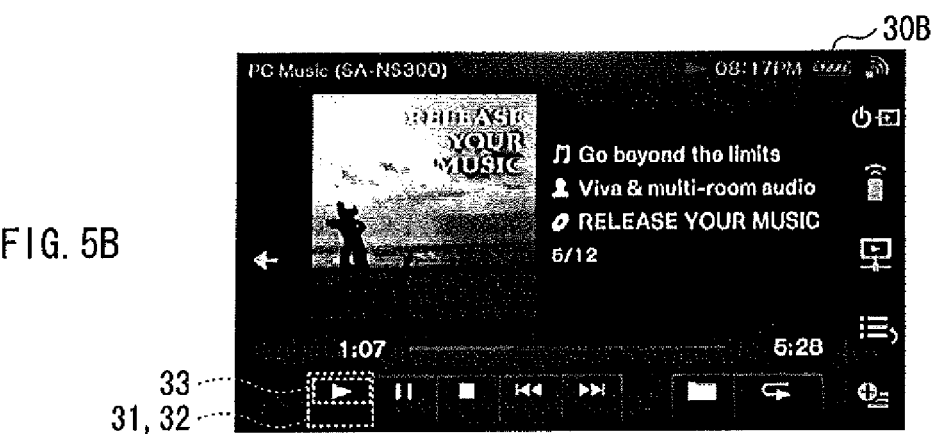
Figure 5C:
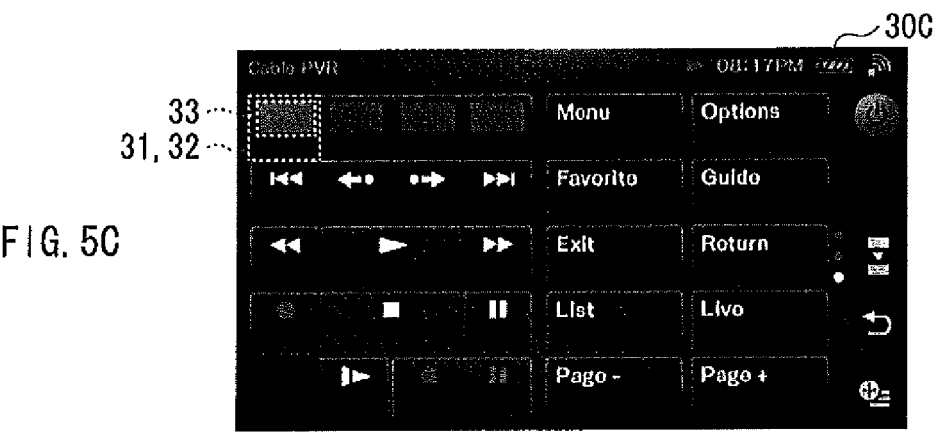

FIGS. 5A to 5C illustrate exemplary operation screens displayed on the display section 21; FIG. 5A illustrates the case where the instruction information T is respreted as letters, FIG. 5B illustrates the case where the instruction information T is represented as symbols; and FIG. 5C illustrates the case where the instruction information T is represented as colors.

In the example of FIG. 5A, a software keyboard for inputting letters is illustrated as an operation screen 30A. In this case, the instruction information T of the operation button 31 is represented as letters (in this example, alphabets and numbers). The instruction information display region 33 is provided in a zone of approximately upper half of the touch detection region 32 (or the operation button 31) in the vertical direction.

In the example of FIG. 5B, an operation screen 30B for reproducing music stored in the PC 13 is illustrated. In this case, the instruction information T of the operation button 31 is represented as symbols (such as reproduce, pause, stop, rewind, fast-forward, and the like). As with FIG. 5A, the instruction information display region 33 is provided in a zone of approximately upper half of the touch detection region (or the operation button 31) in the vertical direction.

In the example of FIG. 5C, an operation screen 30C for operating the video recording/reproducing apparatus 12 is illustrated. In so-called color button, the instruction information T of the operation button 31 is color information (yellow, blue, red, and green). The instruction information display region 33 is provided in a zone of approximately upper two-thirds of the touch detection region 32 (or the operation button 31) in the vertical direction.

As described, since in the remote 20 the instruction information display region 33 in which the instruction information T is displayed is provided in the upward zone within the touch detection region 32 (or the operation button 31), in the case where a touch is carried out while looking the instruction information T, the touched position is likely to fall within the touch detection region 32, for example.

[Effect]

As described above, in the present embodiment, the instruction information display region is provided in the upward zone within the touch detection region (or the display region of the operation button). This makes it possible to reduce the possibility that the touched position is outside of the touch detection region, thereby improving operability.

In present embodiment, the relative relationship between the touch detection region (or the display region of the operation button) and the instruction information display region is statically configured, so that it is possible to realize a simple configuration.

In the above mentioned embodiment, the touch detection region and the display region of the operation button are configured to coincide with each other. However, this is not limitative, and the touch detection region and the display region of the operation button may be slightly different. For example, it is possible that the operation button has a circular shape, and the touch detection region has a rectangular shape circumscribed to the circular shaped operation button.

In the above mentioned embodiment, as illustrated in FIGS. 5A to 5C and so forth, the instruction information T is displayed near the center of the instruction information display region 33 in the lateral direction; however, this is not limitative. Alternatively, for example, the instruction information T may be displayed near the left side of the instruction information display region 33, or, near the right side of the instruction information display region 33.

2. Second Embodiment

Next, an electronic apparatus system 2 according to a second embodiment of the present disclosure is described. The present embodiment differs from the above mentioned first embodiment in the arrangement and the size of the operation button. To be more specific, in the above mentioned first embodiment (FIG. 3), the operation button 31 and the touch detection region 32 are configured to coincide with each other. Alternatively, in the present embodiment, an operation button 34 is configured such that, an instruction information display region 33 is provided in a touch detection region 32 in the upward zone within the touch detection region 32. In other words, in the present embodiment, a remote controller 40 performing a display in the just described manner is used to configure the electronic apparatus system 2. Other configurations are similar to those of the above mentioned first embodiment. It is to be noted that, the same reference numerals are given to the substantially same components as those of the electronic apparatus system 1 according to the above mentioned first embodiment, and description thereof is appropriately omitted.

Figure 6:
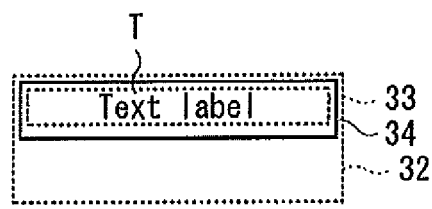
FIG. 6 is an explanatory view illustrating the relationship between an operation button, a touch detection region, and an instruction information display region according to a second embodiment.

FIG. 6 illustrates an example of the operation button 34 arranged on an operation screen. A display region of the operation button 34 is provided in the touch detection region 32 in the upward zone within the touch detection region 32 so as to include the instruction information display region 33. In other words, the touch detection region 32 is widely provided, in addition to the display region of the operation button 34, in such a manner as to be expanded from the lower side of the display region of the operation button 34. In this case, the vertical length of the touch detection region 32 is 0.02 meter, for example.

In this example, even when, in the case where the user touches the display region of the operation button 34, the touched position is on the lower side of the display region of the operation button 34, the touch is detected by the touch detection region 32 widely provided in such a manner as to be expanded from the lower side of the operation button 34.

Figure 7:
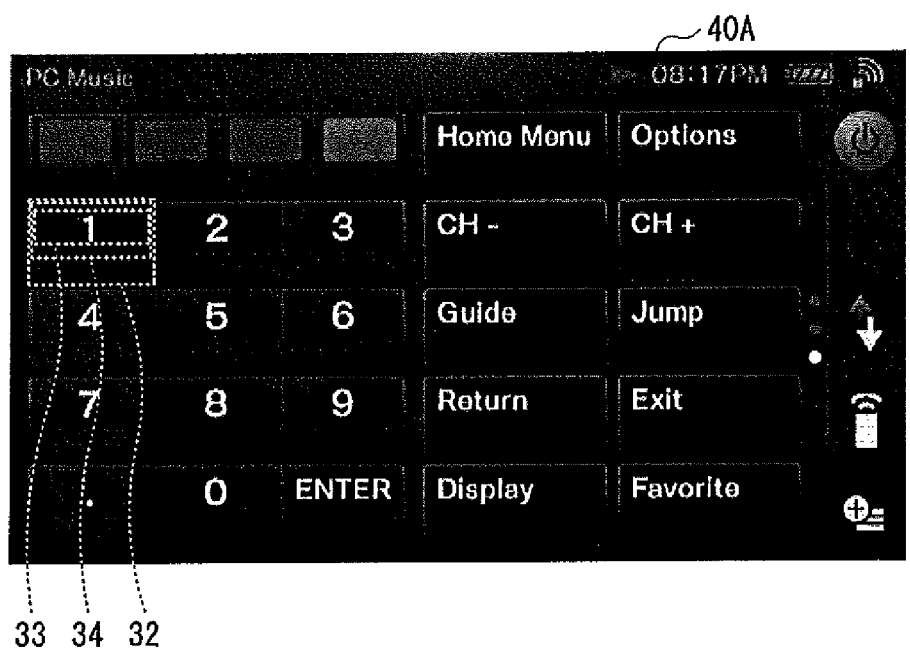
FIG. 7 is an explanatory view illustrating an exemplary display of a display section according to the second embodiment.

FIG. 7 illustrates an exemplary operation screen displayed on the display section 21 of the remote 40. FIG. 7 illustrates an operation screen 40A for operating the video recording/reproducing apparatus 12, and corresponds to FIG. 5C. The instruction information display region 33 is provided in a zone of approximately upper half of the touch detection region 32 in the vertical direction. In addition, the operation button 31 is provided in a zone of approximately upper two-thirds of the touch detection region 32 in the vertical direction.

As described above, in the present embodiment, the display region of the operation button is different from the touch detection region 32, so that it is possible to enhance the degree of freedom of the design of arrangement, size, shape and the like of the operation button. Other effects are similar to those of the above mentioned first embodiment.

3. Third Embodiment

Next, an electronic apparatus system 3 according to a third embodiment of the present disclosure is described. The operation button is not displayed in the present embodiment. In other words, in the present embodiment, the electronic apparatus system 3 is configured using a remote controller 50 which does not display the operation button. Other configurations are similar to those of the above mentioned first and second embodiments. It is to be noted that, the same reference numerals are given to the substantially same components as those of the electronic apparatus system 1 and 2 according to the above mentioned first and second embodiments, and description thereof is appropriately omitted.

Figure 8:
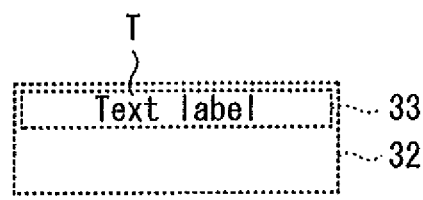
FIG. 8 is an explanatory view illustrating the relationship between a touch detection region and an instruction information display region according to a third embodiment.

FIG. 8 illustrates an example of a touch detection region 32 and an instruction information display region 33 arranged on an operation screen. In this example, the operation button is not displayed, and only instruction information T is displayed in the instruction information display region 33. The instruction information display region 33 is provided in the touch detection region 32 in the upward zone within the touch detection region 32. In other words, the touch detection region 32 is widely provided, in addition to the instruction information display region 33, in such a manner as to be expanded from the lower side of the instruction information display region 33. In this case, the vertical length of the touch detection region 32 is 0.02 meter, for example.

In this example, even when, in the case where the user touches the instruction information display region 33, the touched position is on the lower side of the instruction information display region 33, the touch is detected by the touch detection region 32 widely provided in such a manner as to be expanded from the lower side of the instruction information display region 33.

Figure 9:
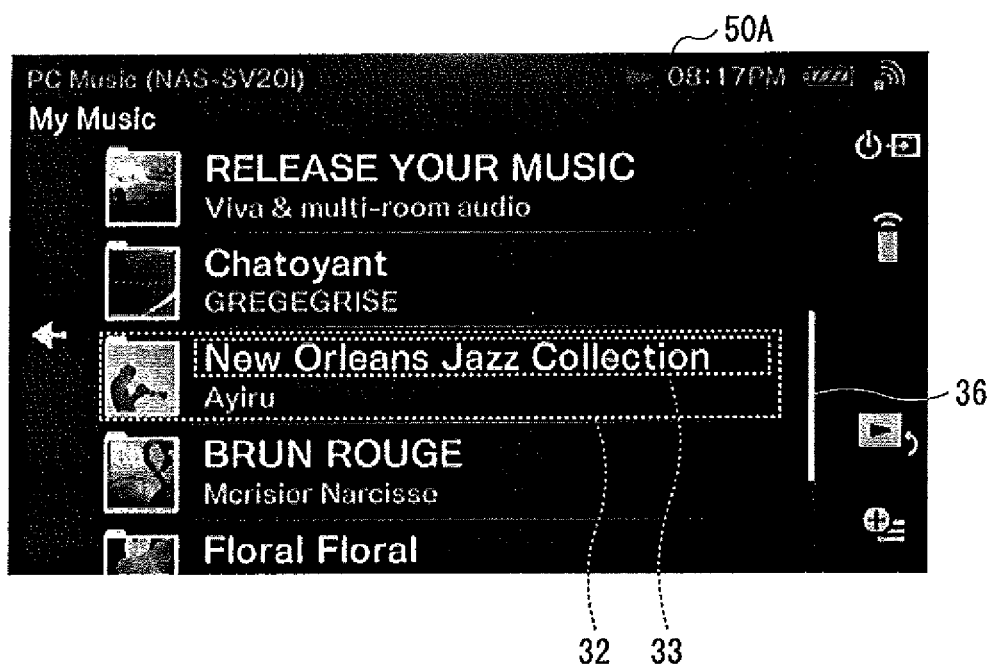
FIG. 9 is an explanatory view illustrating an exemplary display of a display section according to the third embodiment.

FIG. 9 illustrates an exemplary operation screen displayed on a display section 21 of the remote 50. In this example, an operation screen 50A by which to select music from a list of music stored in the PC 13 is displayed. Operating a scroll bar 36 to scroll allows the user to view the list of music from the uppermost portion to the lowermost portion thereof. The touch detection region 32 is configured in each of regions corresponding to one of items in the list. In this example, different from the above mentioned first and second embodiments, the operation button 31 is not displayed, and by being touched a region corresponding to one of the items in the list, the touched item (or music) is selected. The instruction information display region 33 is provided in each of the touch detection region 32 in the upward zone within the touch detection region 32 in the vertical direction. Main information for identifying music is displayed in the instruction information display region 33. In other words, the user selects music based on the information displayed in the instruction information display region 33, and performs a touch. It is to be noted that, in the touch detection region of this example, letters are displayed also on the lower side of the instruction information display region 33. This information is information attendant on the instruction information T displayed in the instruction information display region 33, and is not information based on which the user directly select music.

Figure 10:
FIG. 10 is an explanatory view illustrating another exemplary display of the display section according to the third embodiment.

FIG. 10 illustrates another exemplary operation screen. In FIG. 9, as the number of the items in the list increases, the length of the scroll bar 36 diminishes as is well known. In this example, as illustrated in FIG. 10 for example, when the length of the scroll bar 36 is shorter than a predetermined length, the touch detection region 32 is so configured as to be expanded, in addition to the display region of the scroll bar 36 (or the instruction information display region 33), from the lower side of the region. Specifically, for example, it is possible, in the case where the length of the scroll bar 36 is 0.02 meter or less, to maintain the length of the touch detection region 32 at 0.02 meter, with the upper ends of the touch detection region 32 and the scroll bar 36 being aligned. This allows the user to operate the scroll bar 36 more easily even when the scroll bar is shortened, and therefore it is possible to improve operability.

As described above, since in the present embodiment the instruction information display region is provided in upward zone within the touch detection region, it is possible to improve operability. Other effects are similar to those of the above mentioned first embodiment.

Figure 11:
FIG. 11 is an explanatory view illustrating an exemplary display of a display section according to a modification of the third embodiment.

In the above mentioned embodiment, the scroll bar 36 with fixed width is adopted, but this is not restrictive. Alternatively, for example, as illustrated in FIG. 11, a configuration may be adopted in which, when a region corresponding to the scroll bar 36 is touched, the width W of the scroll bar is widened. Further, as a combination of FIG. 10 and FIG. 11, it is also possible to adopt a configuration in which, the touch detection region is so configured as to be expanded from the lower side of the scroll bar 36 in the case where the number of the items in the list is increased and the scroll bar 36 is shortened, and at the same time, the width of the scroll bar is widened in the case where a region corresponding to the scroll bar is touched.

Hereinbefore, the embodiments of the present disclosure is described with the embodiments and modifications, but the present disclosure is not limited to them, and various modifications may be made.

For example, in the above mentioned embodiments, the descriptions are made taking the remote as an example, but this is not restrictive. Alternatively, the embodiments of the present disclosure may be applied to any display device equipped with a touch panel. Specifically, for example, the embodiments of the present disclosure may be applied to a stationary electronic apparatus such as a desktop PC and a television receiver, a mobile unit such as a mobile music player, a mobile phone, a digital camera, and a laptop PC, and the like.

It should be understood by those skilled in the art that various modifications, combinations, sub-combinations and alterations may occur depending on design requirements and other factors insofar as they are within the scope of the appended claims or the equivalents thereof.

FIG. 2
21: display section
22: touch panel
23: infrared communication section
24: wireless communication section
25: control section
26: flash ROM

What is claimed is:

1. A display device comprising:
a display section displaying instruction information to be instructed to users in an instruction information display region provided corresponding to the instruction information;
a touch panel capturing an instruction represented by the instruction information displayed in the instruction information display region, in response to a users' touch operation to a single individual touch detection region provided corresponding to the instruction information display region; and
a control section performing a predetermined operation control based on the instruction information inputted through the touch panel,
wherein the instruction information display region is provided in an upward zone within the single individual touch detection region such that a center of the instruction information display region is positioned upward from a center of the single individual touch detection region and such that the instruction information pertaining to the single individual touch detection region displayed in the instruction information display region is positioned upward from the center of the single individual touch detection region,
wherein the touch panel has a plurality of single individual touch detection regions each having associated therewith a respective instruction information display region provided in a respective upward zone thereof, and
wherein each respective single individual touch detection region of the plurality of single individual touch detection regions and the respective instruction information display region associated therewith are statically configured such that a relative relationship therebetween is constant and such that a size of the respective single individual touch detection region is constant and is not changable.

2. The display device according to claim 1, wherein the instruction information display region is provided in a zone of upper two-thirds of the touch detection region.

3. The display device according to claim 2, wherein the instruction information display region is provided in a zone of upper half of the touch detection region.

4. The display device according to claim 1, wherein the instruction information is represented as letters, symbols, or colors.

5. The display device according to claim 1, wherein the instruction information is represented as a scroll bar having a length corresponding to a size of the instruction information display region.

6. The display device according to claim 5, wherein the scroll bar is elongated in a vertical direction, and the scroll bar is provided in an upward zone within the touch detection region when a vertical length of the scroll bar is shorter than a predetermined length.

7. The display device according to claim 1, wherein a vertical length of the touch detection region is 0.02 meter or less.

8. The display device according to claim 1, wherein the display section further displays an operation button in a region just coincident with the touch detection region.

9. The display device according to claim 1, wherein the display section further displays an operation button including the instruction information display region therein, and the operation button is provided in an upward zone within the touch detection region.

10. The display device according to claim 1, wherein the display device is a remote controller.

11. The display device according to claim 1, wherein the display device is a mobile unit.

12. The display device according to claim 1, in which the display section further displays an operation button which is associated with the touch detection region and in which the operation button has a shape which is different from that of the touch detection region.

13. The display device according to claim 12, in which the shape of the operation button is circular and the touch detection region has a rectangular shape.

14. The display device according to claim 13, in which the rectangular shaped operation button is circumscribed to the circular shaped operation button.

15. A non-transitory tangible medium in which a display program allowing a computer to execute a procedure is stored, the procedure comprising:

providing a plurality of a single individual touch detection regions on a display screen each having touch detection function;

respectively providing an instruction information display region in an upward zone within each single individual touch detection region; and respectively displaying instruction information to be instructed to users in each said instruction information display region, a center of said instruction information display region is positioned upward from a center of the respective single individual touch detection region such that the respective instruction information pertaining to the respective single individual touch detection region is positioned upward from the center of the respective single individual touch detection region, wherein each respective single individual touch detection region of the plurality of single individual touch detection regions and the respective instruction information display region associated therewith are statically configured such that a relative relationship therebetween is constant and such that a size of the respective single individual touch detection region is constant and is not changable.

16. A display method comprising:

providing a plurality of a single individual touch detection regions on a display screen each having touch detection function;

respectively providing an instruction information display region in an upward zone within each single individual touch detection region; and respectively displaying instruction information to be instructed to users in each said instruction information display region, a center of each said instruction information display region is positioned upward from a center of the respective single individual touch detection region such that the respective instruction information pertaining to the respective single individual touch detection region is positioned upward from the center of the respective single individual touch detection region, wherein each respective single individual touch detection region of the plurality of single individual touch detection regions and the respective instruction information display region associated therewith are statically configured such that a relative relationship therebetween is constant and such that a size of the respective single individual touch detection region is constant and is not changable.

17. A display device comprising:

a display section to display instruction information in a plurality of instruction information display regions for use by a user;

a touch panel having a plurality of touch detection regions respectively corresponding to the plurality of instruction information display regions to enable the user to select a desired instruction represented by the instruction information displayed in a respective instruction information display region in response to a touch operation performed by the user to the respective touch detection region; and a control section performing a predetermined operation control based on the selected instruction information, in which when the display device is arranged so as to be properly viewed by the user, each of the instruction information display regions is respectively provided in an upward zone of each of the touch detection regions such that a center of each instruction information display region in a vertical or upward direction is positioned upward along the vertical direction from a center of each respective touch detection region and such that the instruction information pertaining to each of the touch detection regions respectively displayed in the instruction information display regions thereof is positioned upward along the vertical direction from the center of each respective touch detection region, and in which each instruction information display region and the corresponding respective single individual touch detection region are statically configured such that a relative relationship therebetween is constant and such that a size of the single individual touch detection region is constant and is not changable.

18. The display device according to claim 17, in which the instruction information of each of the touch detection regions is represented as a letter, a symbol, a word or a color which is different for each touch detection region such that the respective letter, symbol, word or color of a first touch detection region is positioned upward along the vertical direction from the center of the first touch detection region.

* * * * *